United States Patent Office.

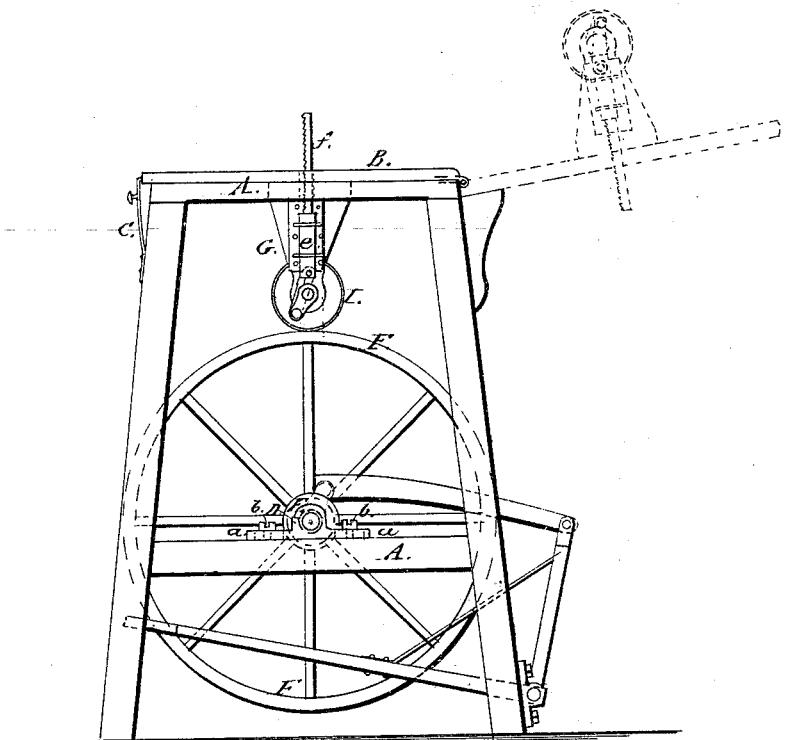
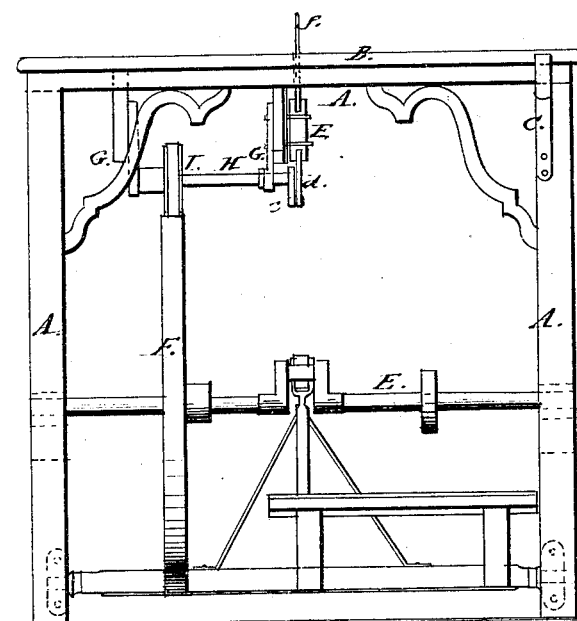

R. M. WASHBURN, OF BURLINGTON, IOWA.

Letters Patent No. 94,678, dated September 7, 1869.

---

IMPROVEMENT IN SCROLL-SAWING MACHINES.

---

The Schedule referred to in these Letters Patent and making part of the same.

---

*To all whom it may concern:*

Be it known that I, R. M. WASHBURN, of Burlington, in the county of Des Moines, and in the State of Iowa, have invented certain new and useful Improvements in Scroll-Sawing Machines; and do hereby declare that the following is a full, clear, and exact description thereof, reference being had to the accompanying drawings, and to the letters of reference marked thereon.

The nature of my invention consists in the construction and general arrangement of a scroll-sawing machine, which will be hereinafter fully set forth.

In order to enable others skilled in the art to which my invention appertains, to make and use the same, I will now proceed to describe its construction and operation, referring to the annexed drawings, which form a part of this specification, and in which—

Figure 1 is an end elevation; and
Figure 2, a side elevation.

A represents a frame of suitable height, provided with a top, B, hinged on one side to the frame, and fastened down on the other to the frame by means of a spring, C, or other suitable device, so constructed that it can easily be removed or released from the top.

At each end of the frame, and at a suitable distance from the ground, is placed an adjustable journal-box, D, in which boxes the shaft E has its bearings.

The journal-boxes D D are made adjustable by means of slotted wings, $a\ a$, extending one from each side of each box, said wings being secured by means of screws or bolts, $b\ b$, to the frame A, which screws pass through the slots in the wings. It will readily be seen, that by merely loosening the screws $b\ b$, the journal-boxes D D can be moved to either side, carrying the main shaft E with them. The object of so moving the shaft will be hereinafter set forth.

The shaft E, which may be turned by a treadle, as represented in the drawings, or by a crank, or by any other known motive-power, is provided with a wheel, F, of suitable diameter.

On the under side of the top or table B are two ears, G G, in which a shaft, H, has its bearings. This shaft is provided with a wheel, I, having an outer band or covering of rubber, leather, or other suitable material, and is of such size as to come in contact with the wheel F when the top B is fastened down to the frame A. Thus the motion of the main shaft E is, by the friction of the two wheels F and I, communicated to the shaft H.

To one end of the shaft H is secured a crank, $c$, which, by a small pitman, $d$, is connected with a bar, $e$, which runs vertically in guides on the side of one of the ears G, and to the upper end of which bar the saw $f$ is clamped. This saw runs up through a slot in the top B, said slot being lined with a plate of steel or other hard metal, against which the back of the saw moves.

The advantages of a scroll-saw thus arranged are manifold, but I will only mention the most prominent: The application of friction to drive it; there is not any upper support, attachment, or guide; the saw does not have to be detached or removed to cut out designs, as is customary in other saws now in use; neither is there any support, attachment, or guide to be removed for the purposes named; the saw need not be stopped, as is necessary with all other saws for the purpose of changing from one design to another.

The journal-boxes in which the main shaft turns can be moved either way, for the purpose of giving more or less pressure on the friction-wheel. By removing the spring C the top B will raise enough by the pressure of the spring, or any elastic substance introduced between the top and the frame, to stop the saw. To start the saw again it is only necessary to press the top down again until the spring catches and holds it.

It will readily be seen that by my arrangement a very small saw, of say about two or two and a half inches, will answer all the purposes of the larger saws heretofore used.

Having thus fully described my invention,
What I claim as new, and desire to secure by Letters Patent, is—

The arrangement of the hinged top B, shaft H, wheel I, crank $c$, pitman $d$, bar $e$, and saw $f$, all being constructed to operate substantially as and for the purposes herein set forth.

In testimony that I claim the foregoing, I have hereunto set my hand, this 10th day of March, 1869.

R. M. WASHBURN.

Witnesses:
JAMES. W. POSTLEWAIT,
GEORGE WHIPPLE.
GEO. L. BARTLETT.